UNITED STATES PATENT OFFICE.

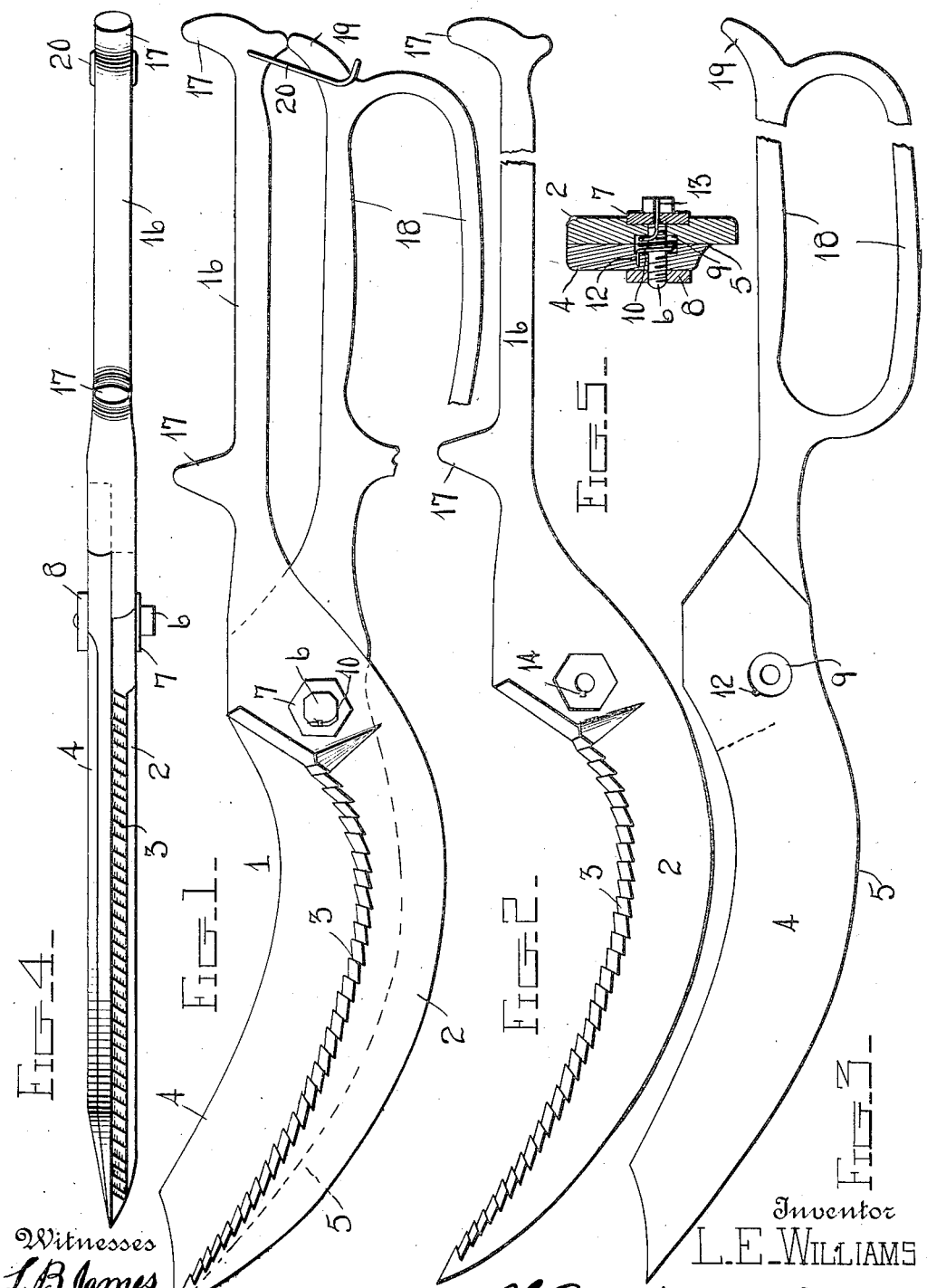

LOUIS EDGAR WILLIAMS, OF FREMONT, OHIO, ASSIGNOR OF ONE-HALF TO WILLIAM K. SMITH, OF TIFFIN, OHIO.

POULTRY AND MEAT CARVER.

No. 908,368.　　　Specification of Letters Patent.　　　Patented Dec. 29, 1908.

Application filed February 3, 1908. Serial No. 414,049.

*To all whom it may concern:*

Be it known that I, LOUIS EDGAR WILLIAMS, a citizen of the United States, residing at Fremont, in the county of Sandusky and State of Ohio, have invented certain new and useful Improvements in Poultry and Meat Carvers; and I do declare the following to be a full, clear, and exact description of the invention, such as will enable others skilled in the art to which it appertains to make and use the same.

This invention relates to improvements in carving devices for poultry and meat.

The object of the invention is to provide an improved device of this kind by means of which the carving of poultry and meat will be greatly facilitated, means being provided whereby the meat or poultry will be held from slipping while being cut.

With this object in view, the invention consists of certain novel features of construction, combination and arrangements of parts as will be more fully described, and particularly pointed out in the appended claims.

In the accompanying drawings, Figure 1 is a side view of a carving device constructed in accordance with the invention; Fig. 2 is a similar view of the holding blade of the carver; Fig. 3 is a similar view of the cutting blade; Fig. 4 is an edge view of the device; and Fig. 5 is a cross sectional view taken through the pivotal connection of the blades.

Referring more particularly to the drawings, 1 denotes the carver which consists of a curved or segmental holding blade, 2, on the inner curved edge of which is formed a series of bevel teeth, 3, which, when the device is in operation, are adapted to hold poultry or meat being cut.

Pivotally connected to the blade 2 and adapted to co-act therewith is a cutting blade, 4, said blade being provided with a curved cutting edge, 5, which is adapted to co-act with the toothed edge of the holding blade after the manner of a pair of shears to cut or sever the meat or poultry, the teeth, 3, serving to hold the meat or poultry while the blade 4 cuts the same.

The blades 2 and 4 are pivotally connected together at their inner ends by a bolt 6, on the headed end of which is arranged a washer, 7, which is seated in a recess in the outer side of the blade 2, as shown. The opposite end of the bolt 6 is adapted to receive a clamping nut 8, which is screwed up against the outer side of the blade 4 and holds the blades in operative engagement. On the inner faces of each of the blades 2 and 4, concentric to the bolt holes formed therein, are formed annular recesses, 9, which, when the blades are brought together, form a space or pocket, in which is arranged a coiled spring, 10. The spring 10 is coiled around the bolt 6 and one end of the same is bent at right angles and secured in a hole 12, formed in the blade 4. The opposite end of the spring 10 is adapted to project through a hole or passage 14 formed in the blade 2 and through a notch 15 formed in the washer 7, and the head of the bolt, 6, thereby securely fastening this end of the spring. By providing the spring 10 and arranging the same as herein shown and described, the tension thereof will be exerted to normally force the blades apart.

The inner end of the blade 2 is provided with an integrally formed handle 16, having thereon inner and outer laterally projecting stop lugs 17, by means of which a firm engagement or grip may be taken on said handle. The blade 4 is provided with an integrally formed handle, 18, which is in the form of a loop, and is adapted to receive the fingers when the handles 16 and 18 are grasped. On the outer ends of the handles 16 and 18 are formed stop lugs 19, which are adapted to be engaged when the handles are brought together, thereby limiting the movement of the blades 2 and 4. Pivotally mounted in the end of the handle 16 is a fastening bail or loop 20, the looped end of which is adapted to be engaged with the lug 19 on the handle 18 to secure said handles and blades together against the tension of the opening spring 10.

From the foregoing description, taken in connection with the accompanying drawings, the construction and operation of the invention may be readily understood without requiring a more extended explanation.

Various changes in the form, proportion and the minor details of construction may be resorted to without departing from the principle or sacrificing any of the advantages of the present invention, as defined in the appended claims.

Having fully described my invention, what

I claim as new and desire to secure by Letters-Patent, is:

1. In a carving device, a pair of cutting blades having formed therein pivot holes and alined recesses, which, when the blades are brought together, form a pocket, a pivot bolt in said pivot holes, a blade-opening spring around said bolt and seated in said pocket, means whereby one end of said spring is secured to said bolt, and means whereby its opposite end is operatively connected to one of the blades, substantially as described.

2. In a carving device, a pair of cutting blades having formed therein pivot holes and alined recesses, which, when said blades are brought together, form a pocket, a pivot bolt having on one end a head and washer and on its opposite end a nut, said head and washer having in one side alining notches, and a coiled spring around said bolt and seated in said pocket, one end of said spring projecting through one of the blades and into the notches in said head and washer, and the opposite end of the spring projecting into a recess in the opposite blade, substantially as described.

3. A carving device of the character described, comprising a pair of curved pivotally connected co-acting blades, a cutting edge formed on one of said blades, a series of holding teeth formed on the co-acting edge of the opposite blade, a bolt to pivotally connect said blades together, a coiled spring arranged around said bolt and seated in a pocket formed by recesses arranged in the inner sides of the blades around said bolt, the tension of said spring being adapted to force said blades apart, handles on the inner ends of said blades, gripping lugs formed on one of said handles, a finger loop formed on the opposite handle, and a fastening bail pivotally mounted in the end of one of said handles and adapted to be engaged with the lug on the opposite end to hold the blades in a closed position, substantially as described.

In testimony whereof I have hereunto set my hand in presence of two subscribing witnesses.

LOUIS EDGAR WILLIAMS.

Witnesses:
JOSEPH T. SCHWARTZ,
JOSEPH SCHWARTZ.